(12) United States Patent
Koumura

(10) Patent No.: US 7,755,249 B2
(45) Date of Patent: Jul. 13, 2010

(54) ALTERNATOR WITH ROTOR FOR VEHICLE

(75) Inventor: Masatoshi Koumura, Okazaki (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 12/232,299

(22) Filed: Sep. 15, 2008

(65) Prior Publication Data
US 2009/0079285 A1    Mar. 26, 2009

(30) Foreign Application Priority Data
Sep. 21, 2007    (JP) .............................. 2007-245846

(51) Int. Cl.
*H02K 1/22*    (2006.01)
(52) U.S. Cl. .................. 310/263; 310/156.71
(58) Field of Classification Search ................. 310/263, 310/156.71, 156.66, 156.77
See application file for complete search history.

(56) References Cited

U.S. PATENT DOCUMENTS

| 4,302,693 A * | 11/1981 | Burgmeier et al. ..... 310/156.59 |
| 5,483,116 A | 1/1996 | Kusase et al. |
| 5,793,144 A | 8/1998 | Kusase et al. |
| 5,907,209 A | 5/1999 | Ishida |
| 5,925,964 A | 7/1999 | Kusase et al. |
| 5,973,435 A * | 10/1999 | Irie et al. ..................... 310/263 |
| 6,011,343 A * | 1/2000 | Taniguchi ................... 310/263 |
| 6,013,968 A * | 1/2000 | Lechner et al. ............. 310/263 |
| 6,150,746 A * | 11/2000 | Lechner ....................... 310/181 |
| 6,853,112 B2 * | 2/2005 | Nakamura et al. .......... 310/263 |
| 6,924,580 B2 * | 8/2005 | Tajima et al. ............... 310/263 |
| 7,545,074 B2 * | 6/2009 | Maekawa et al. ........... 310/263 |
| 7,605,511 B2 * | 10/2009 | Oowatari et al. ....... 310/156.72 |

FOREIGN PATENT DOCUMENTS

| JP | A-10-201150 | 7/1998 |
| JP | A-2005-080472 | 3/2005 |

* cited by examiner

*Primary Examiner*—Thanh Lam
(74) *Attorney, Agent, or Firm*—Oliff & Berridge PLC

(57) ABSTRACT

An alternator has a rotor rotated on its own axis to generate electric power in a stator. The rotor has pole cores with claw portions arranged along the circumferential direction, and a holder unit is disposed between two adjacent claw portions in each pair. Each holder unit has a magnet accommodating holder and a magnet covering holder. Each holder has one bottom wall, four side walls and one opening. The magnet accommodating holder accommodates a magnet. The magnet covering holder is placed between the claw portions and accommodates the magnet accommodating holder while covering the magnet exposed to the opening of the magnet accommodating holder. The magnet accommodating holder has convex portions existing in the respective side and bottom walls and being in elastic contact with the magnet.

14 Claims, 12 Drawing Sheets

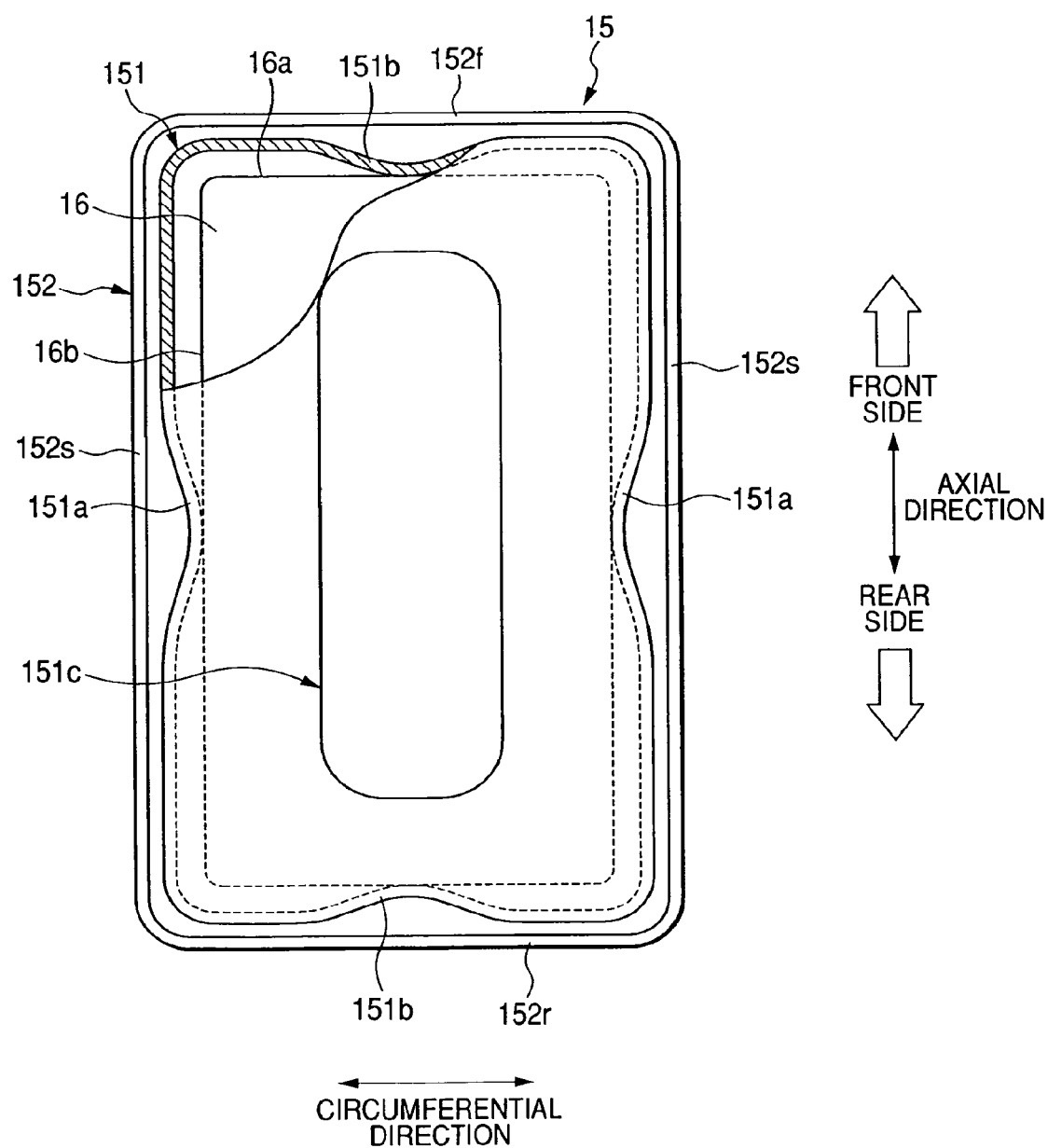

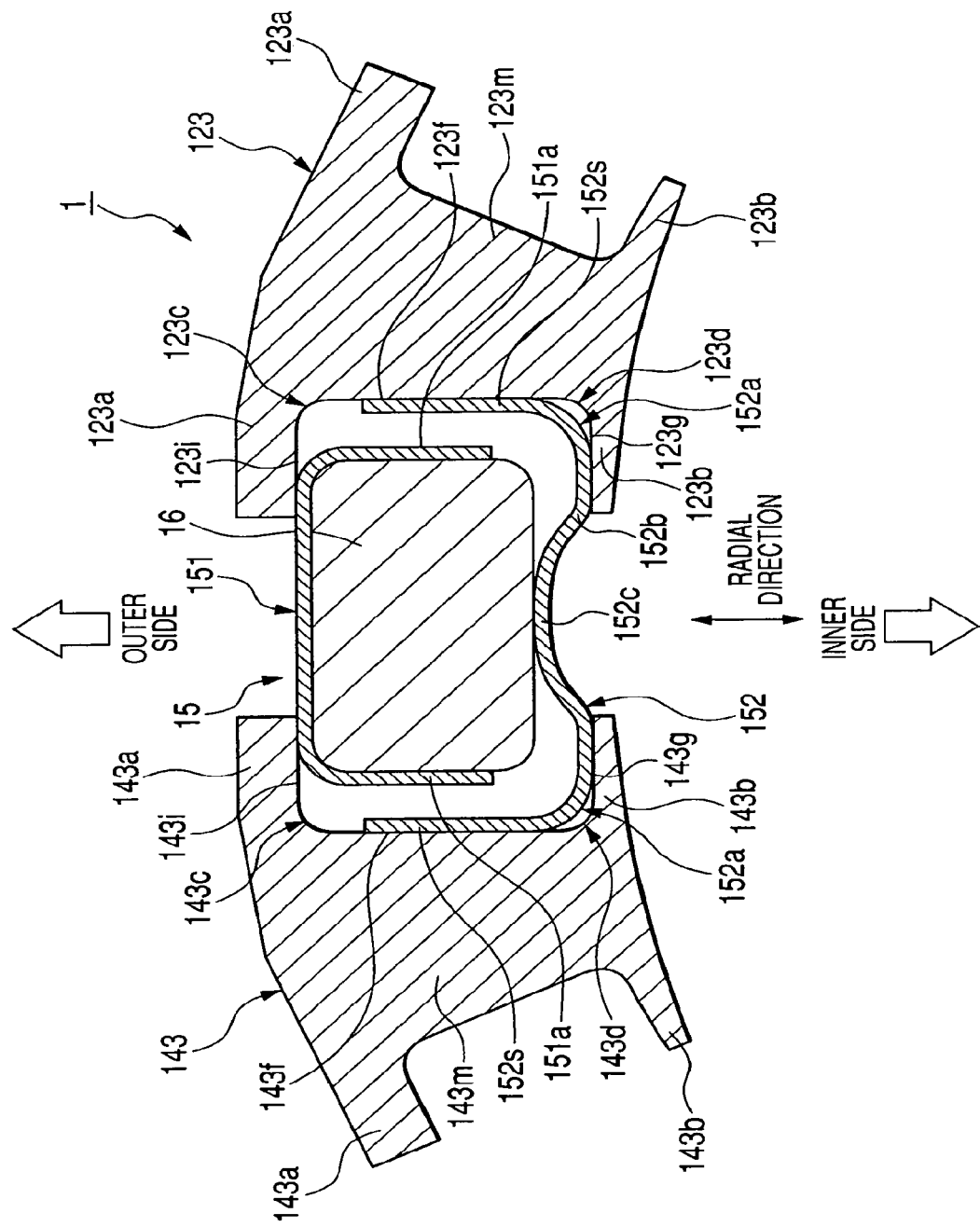

ALTERNATOR WITH ROTOR FOR VEHICLE

CROSS-REFERENCE TO RELATED APPLICATION

This application is based upon and claims the benefit of priority of the prior Japanese Patent Application 2007-245846 filed on Sep. 21, 2007, so that the contents of which are incorporated herein by reference.

BACKGROUND OF THE INVENTION

1. Field of the Invention

The present invention relates generally to an alternator with a rotor mounted in a vehicle, and more particularly to the rotor having a plurality of claw portions of two pole cores wherein a magnet is disposed between two adjacent claw portions in each pair.

2. Description of Related Art

An alternator for a vehicle has a cylindrical stator and a rotor disposed in the center hole of the stator. In the stator, a plurality of stator coils connected with one another are wound on a stator core. The rotor has a pair of Lundell type pole cores, a field coil wound on the pole cores, and a plurality of claw portions disposed on one end of each pole core. The claw portions of the first pole core and the claw portions of the second pole core are alternately arranged along the circumferential direction of the rotor. The rotor is configured to magnetize the claw portions by the magnetic field induced in the field coil in response to the high speed rotation of the rotor and to rotate the magnetic field strengthened by the magnetized claw portions. Therefore, the stator core placed in the rotated magnetic field is magnetized, electric power is induced in the stator coils, and the alternator outputs this electric power.

Further, a magnet is disposed between two adjacent claw portions in each pair such that the magnetic field of the magnet is directed so as to reduce the leakage of the magnetic flux induced by the magnetized claw portions. These magnets heighten the electric fields induced in the rotor, so that the outputted electric power is increased by the magnets. An alternator having these magnets is, for example, disclosed in Published Japanese Patent First Publication No. 2005-80472. In this alternator, each magnet is accommodated in a holder, and each holder with magnet is inserted into a space between two claw portions adjacent to each other.

However, in this Publication, each magnet is disposed in the holder such that the magnet is exposed to an opening of the holder. Therefore, when the alternator or rotor is covered with water, the magnet is easily exposed to the water and is wet with the water. In this case, the magnet is corroded so as to degrade the magnetic characteristics of the magnet. As a result, the output electric power is sometimes lowered. Further, when the deteriorated magnet gets a shock, the magnet is sometimes broken, and broken pieces fly out from the holder and intrude between the rotor and the stator. In this case, the broken pieces sometimes stop the rotation of the rotor.

Further, the magnets held in the holders differ from one another in size by tolerance in manufacturing. Therefore, the magnet is not fixed to the holder well, so that the magnet is insecurely fixed in the holder. In this case, the magnet is easily broken, and/or the magnet rattles in the holder.

SUMMARY OF THE INVENTION

An object of the present invention is to provide, with due consideration to the drawbacks of the conventional alternator, an alternator with a rotor wherein a magnet is stably held in a holder placed between claw portions of the rotor and is reliably protected from water or the like.

According to a first aspect of this invention, the object is achieved by the provision of an alternator with a rotor being disposed in a center hole of a stator and being rotated on its own axis to generate electric power in a stator, wherein the rotor comprises a pole core having a plurality of claw portions disposed along a circumferential direction of the rotor, a field coil disposed on an inner side of the claw portions in a radial direction of the rotor, a plurality of holder units each of which is disposed between two claw portions adjacent to each other such that the holder units and the claw portions are alternately arranged along the circumferential direction, and a plurality of magnets, respectively, disposed in the holder units. Each holder unit comprises a magnet accommodating holder, formed substantially in a box shape so as to have a bottom wall, four side walls extending from the bottom wall and an opening on respective six faces, and a magnet covering holder formed substantially in a box shape so as to have a bottom wall, four side walls extending from the bottom wall and an opening on respective six faces. The magnet accommodating holder accommodates the corresponding magnet. The magnet covering holder accommodates the magnet accommodating holder so as to cover the magnet exposed to the opening of the magnet accommodating holder and is disposed between the corresponding claw portions such that the opening of the magnet covering holder faces toward a side in the radial direction. Each of the side walls of the magnet accommodating holder has a first convexity which is in elastic contact with the magnet. The bottom wall of at least one of the magnet accommodating holder and the magnet covering holder has a second convexity which is in elastic contact with the magnet.

With this structure of the alternator, the rotor is rotated on its own axis in response to an external rotational force. When a current flows through the field coil while changing the flow direction in response to the rotation of the rotor, the field coil induces a magnetic field rotated with the rotor, and the claw portions of the pole core are magnetized by the magnetic field. The polarities of the adjacent claw portions in each pair differ from each other. The magnets disposed in the holding units act to prevent the magnetic field strengthen by the claw portions from being leaked from the alternator. The stator placed in the rotated magnetic field generates electric power. This electric power is outputted from the alternator. Therefore, the alternator produces electric power from the rotational force.

Further, the first convexity is disposed on one side wall of the magnet accommodating holder so as to be in elastic contact with the magnet, and the second convexity is disposed on the bottom wall of the magnet accommodating holder or the magnet covering holder so as to be in elastic contact with the magnet. Therefore, the first convexity gives the first elastic force directed perpendicular to the side wall to the magnet, and the second convexity gives the second elastic force directed perpendicular to the bottom wall to the magnet. That is, each magnet is elastically held by the magnet accommodating holder in different directions.

Accordingly, even when the holder units or the magnets held in the holder units differ from one another in size by tolerance in manufacturing, each magnet elastically held in the holder unit in different directions can be stably held in the holder unit without being insecurely fixed in the holder unit or rattling in the holder unit, and the magnet will resist being broken in the holder unit.

Further, the magnet covering holder covers the magnet exposed to the opening of the holder. Therefore, even when the alternator or rotor is covered with liquid such as water, the holder can prevent the magnet from being covered with liquid. Accordingly, the magnet can be reliably protected from the liquid, and the corrosion of the magnet caused by corrosive substance can be prevented.

Moreover, even when the magnet is cracked in the holder unit, the magnet covering holder covering the magnet can reliably prevent broken pieces from being ejected from the holder unit.

According to a second aspect of this invention, the object is achieved by the provision of an alternator with the stator and the rotor, wherein the rotor comprises the pole core having the claw portions, the field coil, the holder units, and the magnets. Each holder unit comprises a magnet accommodating holder accommodating the corresponding magnet, a magnet covering holder disposed between the corresponding claw portions, and an elastic member. The magnet accommodating holder is formed substantially in a box shape and has an opening. The magnet covering holder is formed substantially in a box shape and has an opening. The opening of the magnet covering holder faces toward a side in the radial direction. The magnet covering holder covers the magnet exposed to the opening of the magnet accommodating holder. The elastic member is disposed substantially uniformly in a space between the magnet and the magnet accommodating holder so as to be in elastic contact with the magnet and the magnet accommodating holder.

With this structure of the alternator, the magnet accommodating holder elastically holds the magnet through the elastic member in various directions.

Accordingly, in the same manner as in the first aspect, each magnet can be stably held in the holder unit without being insecurely fixed in the holder unit or rattling in the holder unit, and the magnet will resist being broken in the holder unit. Further, the magnet covering holder can prevent the magnet from being covered with liquid, so that the magnet can be reliably protected from the liquid. Moreover, the magnet covering holder can reliably prevent broken pieces from escaping from the holder unit.

BRIEF DESCRIPTION OF THE DRAWINGS

FIG. 5 is a view, partially in cross-section, of a holder unit accommodating a magnet when the holder unit is seen from a Q-view side of FIG. 3;

FIG. 6 is a sectional view, taken substantially along line A-A of FIG. 2, of a holder unit accommodating a magnet according to a modification of the first embodiment;

DETAILED DESCRIPTION OF THE PREFERRED EMBODIMENTS

Figure 1:
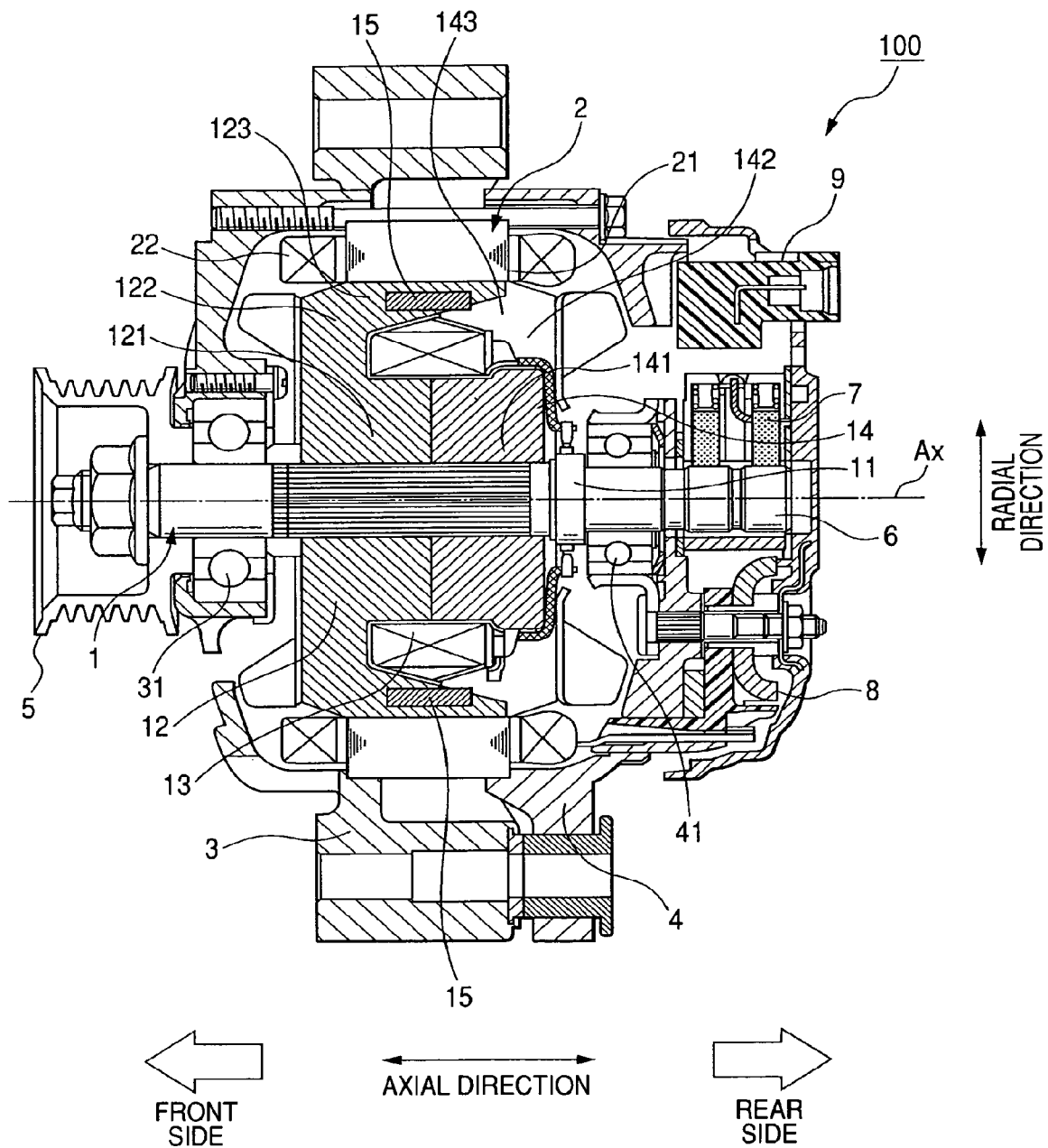
FIG. 1 is a longitudinal sectional view of an alternator for a vehicle according to embodiments of the present invention.

Embodiments of the present invention will now be described with reference to the accompanying drawings, in which like reference numerals indicate like parts, members or elements throughout the specification unless otherwise indicated.

Embodiment 1

Figure 2:
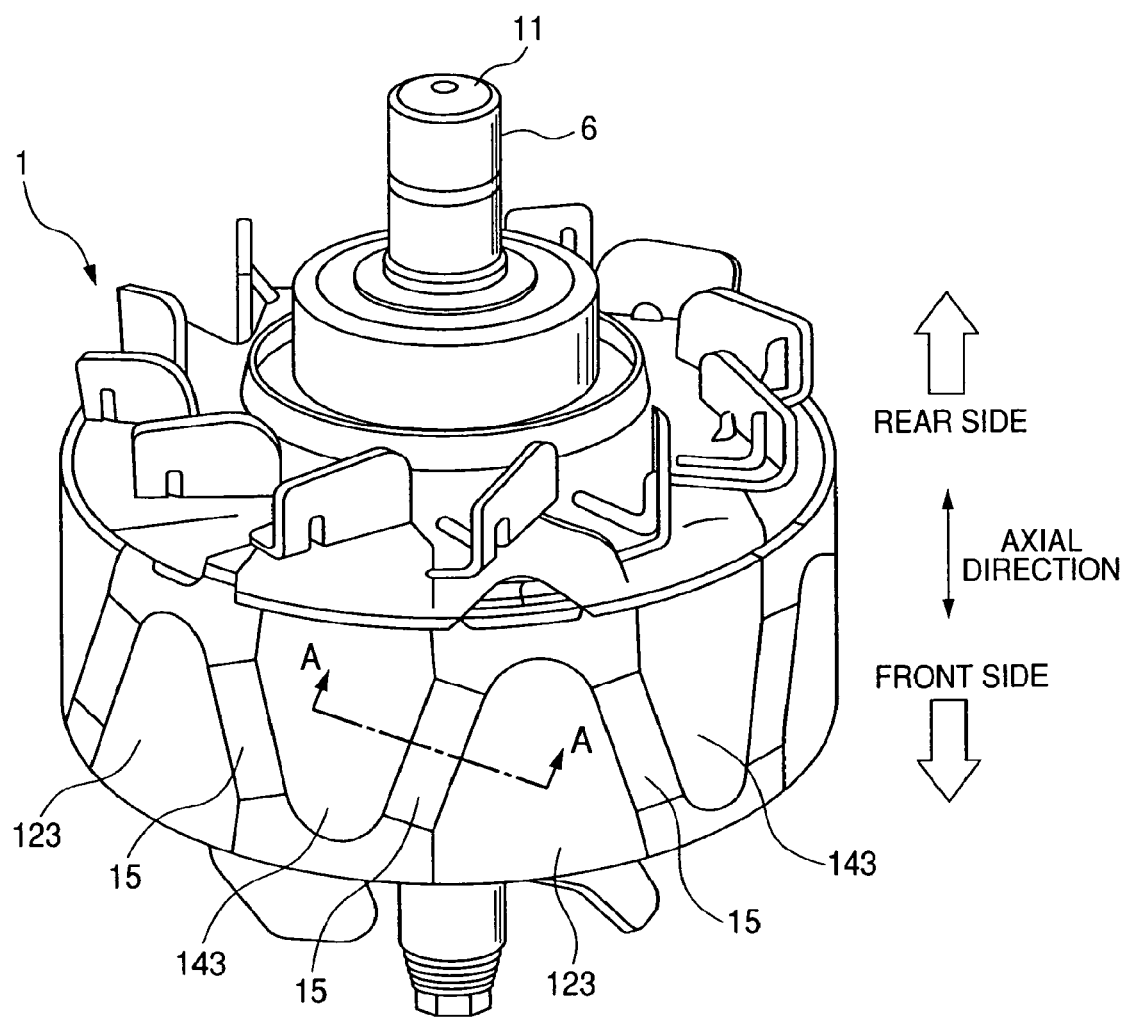
FIG. 2 is a perspective side view of a rotor disposed in the alternator shown in FIG. 1.

FIG. 1 is a longitudinal sectional view of an alternator for a vehicle according to embodiments, while FIG. 2 is a perspective side view of a rotor disposed in the alternator shown in FIG. 1.

As shown in FIG. 1 and FIG. 2, an alternator 100 has a cylindrical stator 2, a rotor 1 disposed in a center hole of the stator 2 so as to be rotated on its own axis Ax, a front frame 3 covering the front and center portions of the rotor 1 and stator 2, a rear frame 4 covering the rear portions of the rotor 1 and stator 2, a pulley 5 for receiving a rotational force from a crank shaft of an engine (not shown) and transmitting the force to a rotary shaft 11 of the rotor 1, two slip rings 6 attached to the shaft 11, a brush unit 7 with two flexible brushes being slidably in contact with the slip rings 6 to transmit a field current to the rotor 1 through one ring 6 and to receive the current from the rotor 1 through the other ring 6 while changing the flow direction of the current every half rotation of the shaft 11, a rectifier 8 for rectifying an alternating current of electric power induced in the stator 2 in response to the rotation of the rotor 1, and a regulator 8 for adjusting the field current according to the electric power.

The stator 2 has a stator core 21 and a stator coil 22 wound on the core 21. The core 21 is fixed to the frames 3 and 4 through bolts (not shown). The front frame 3 rotatably holds the rotary shaft 11 of the rotor 1 through a bearing 31. The rear frame 4 rotatably holds the shaft 11 through a bearing 41.

The rotor 1 has a front pole core 12, a rear pole core 13, the shaft 11 to which the cores 12 and 13 are fixedly attached, a field coil 13, and a plurality of permanent magnets 16 accommodated in respective holder units 15. The cores 12 and 14 are so-called Lundell type pole cores. More specifically, The core 12 has a boss portion (or core body) 121 attached to the shaft 11, a disc portion (or core body) 122 extending from the front end of the boss portion 121 toward the outer side in the radial direction of the rotor 1, and a plurality of first claw portions 123 extending from the end of the disc portion 122 toward the rear side in the axial direction of the rotor 1 perpendicular to the radial direction. The claw portions 123 are arranged along the circumferential direction of the rotor 1 perpendicular to the radial and axial directions. The disc portion 122 and the boss portion 121 are integrally formed with each other.

The pole core 14 has a boss portion (or core body) 141, a disc portion (or core body) 142 extending from the rear end of the boss portion 141 toward the outer side, and a plurality of second claw portions 143 extending from the end of the disc portion 142 toward the front side in the axial direction. The pole cores 12 and 14 have the same shape, and the rear end face of the core 12 is in contact with the front end face of the core 14. The cores 12 and 14 are formed of magnetic substance of mild steel. The claw portions 123 and 143 are alternately arranged along the circumferential direction at predetermined intervals. The field coil 13 is wound on the pole cores 12 and 14 and is surrounded by the pole cores 12 and 14 such that the coil 13 is placed on the inner side of the claw portions 123 and 143 in the radial direction.

Each holder unit 15 accommodating the magnet 16 is disposed between two adjacent claw portions 123 and 143. The magnetization direction of the magnet 16 is set so as to reduce the leakage of the magnetic fluxes induced in the claw portions 123 and 143.

With this structure of the alternator 100, the rotor 1 is rotated in response to the rotational force received in the pulley 5. When a field current adjusted in the regulator 9 is supplied to the field coil 13 through the brush unit 7 and the rings 6, the flow direction of the field current is changed in response to the rotation of the rings 6 every half rotation of the rotor 1. Therefore, the field coil 13 induces a magnetic field rotated with the rotor 1, and the claw portions 123 and 143 are magnetized by the magnetic field. The magnetic polarity of each claw portion is changed every half rotation of the rotor 1, and the polarities of the claw portions 123 and 143 adjacent to each other differ from each other. The stator core 21 of the stator 2 is magnetized by the rotated magnetic field induced in the rotor 1, and the stator coils 22 generate an alternating current in response to the rotated magnetic field strengthened by the stator core 21. The rectifier 8 rectifies this alternating current to a direct current. Then, electric power having the direct current is outputted from the alternator 100 to current consuming elements (not shown) and a battery (not shown).

Because the magnet 16 is disposed between the adjacent claw portions 123 and 143 so as to reduce the leakage of the magnetic fluxes induced in the magnetized claw portions 123 and 143, the magnetic fluxes of the claw portions are strengthened. Accordingly, on condition that the magnets 16 are not corroded or broken, the electric power induced in the stator 2 can be heightened by the magnets 16, so that the output of the electric power can be efficiently obtained. This structure and operation of the alternator 100 described above are well known, and further detailed description of the alternator 100 is omitted.

Figure 3:
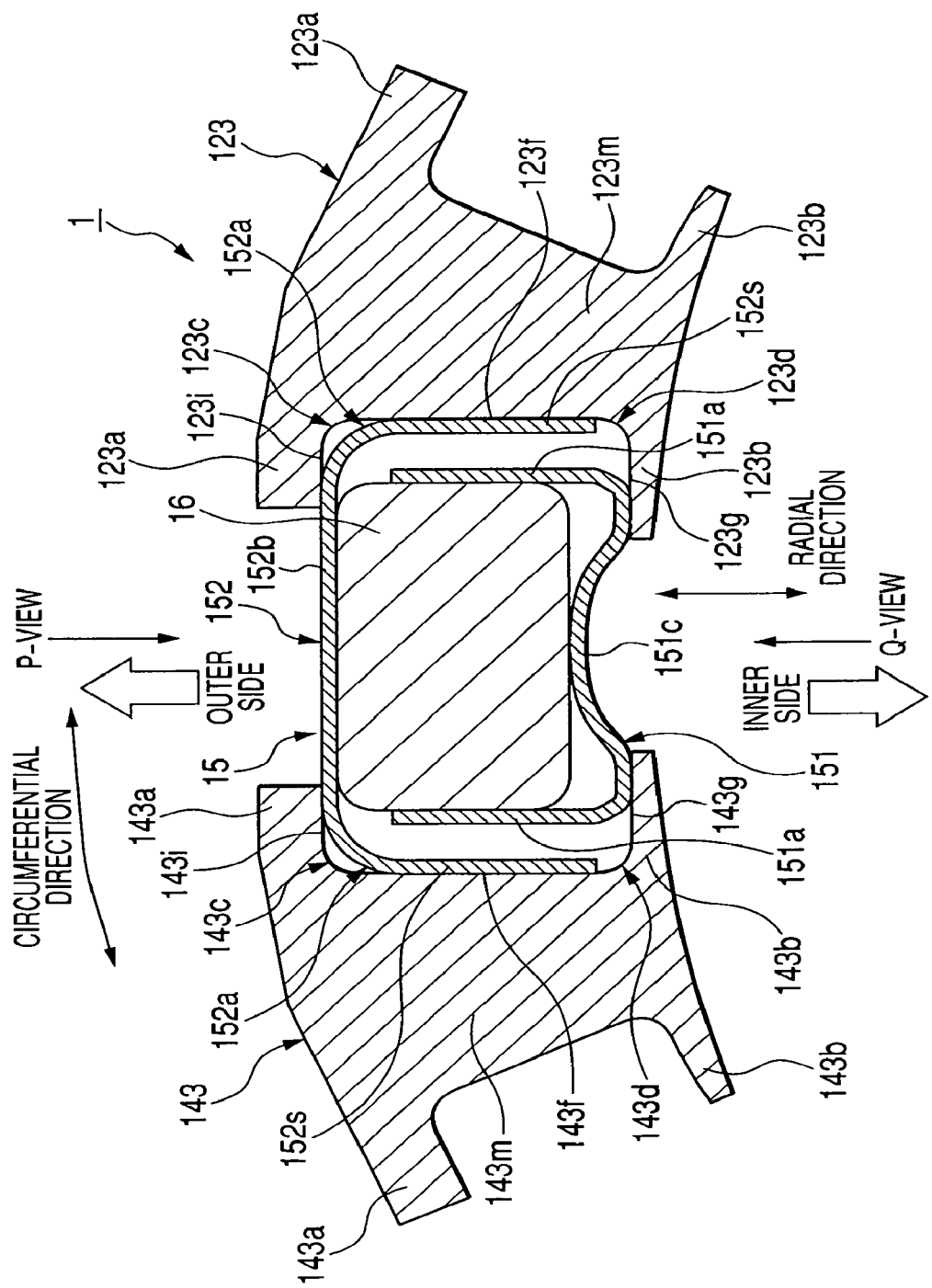
FIG. 3 is a sectional view taken substantially along line A-A of FIG. 2.
Figure 4:
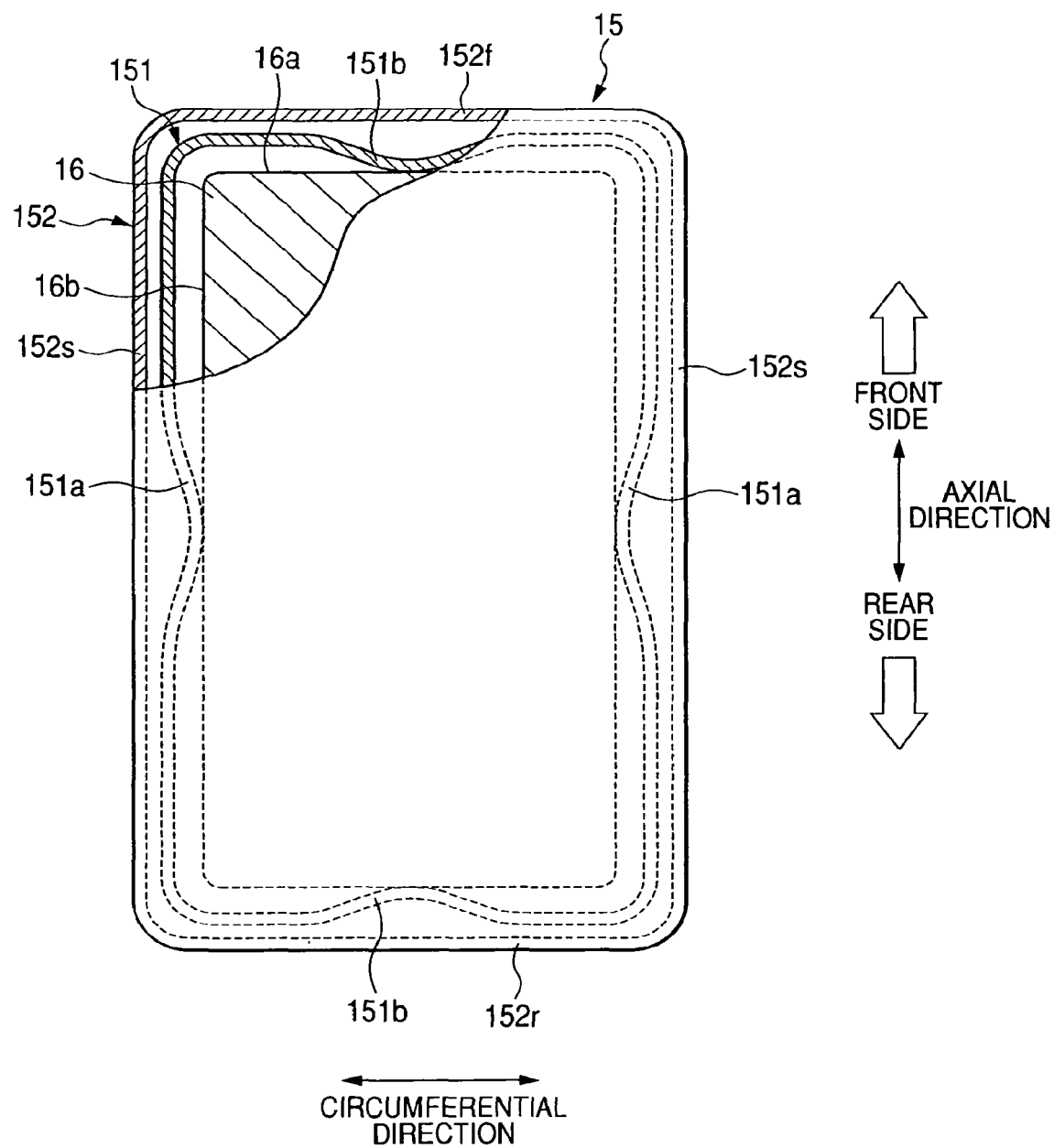
FIG. 4 is a view, partially in cross-section, of a holder unit accommodating a magnet, when the holder unit is seen from a P-view side of FIG. 3, according to the first embodiment of the present invention.

The structures of the holder units 15 and the claw portions 123 and 143 will be described in detail with reference to FIG. 3 to FIG. 5. FIG. 3 is a sectional view taken substantially along line A-A of FIG. 2. FIG. 4 is a view, partially in cross-section, of the holder unit 15 accommodating the magnet 16 when the holder unit 15 is seen from a P-view side of FIG. 3. FIG. 5 is a view, partially in cross-section, of the holder unit 15 accommodating the magnet 16 when the holder unit 15 is seen from a Q-view side of FIG. 3.

In this embodiment, as shown in FIG. 2, the longitudinal direction of each holder unit 15 is slightly inclined to the axial direction. However, for convenience of explanation, it is regarded in the following descriptions that the longitudinal direction of each holder unit 15 accords with the axial direction of the rotor 1.

As shown in FIG. 3, each claw portion 123 has a main body 123m, two outer brims 123a protruding from the outer end of the body 123m in the circumferential direction, and two inner brims 123b protruding from the inner end of the body 123m in the circumferential direction. In the same manner, each claw portion 143 has a main body 143m, two outer brims 143a protruding from the outer end of the body 143m in the circumferential direction, and two inner brims 143b protruding from the inner end of the body 143m in the circumferential direction.

Further, the body 123m of each claw portion 123 has two side faces 123f placed opposite to each other in the circumferential direction, and the body 143m of each claw portion 143 has two side faces 143f placed opposite to each other in the circumferential direction. Two side faces 123f and 143f of each pair of adjacent claw portions 123 and 143 face each other. Each side surface 123f is placed between the brims 123a and 123b of the corresponding claw portion 123, and each side surface 143f is placed between the brims 143a and 143b of the corresponding claw portion 143. Each claw portion 123 has two rounded corners 123c and two rounded corners 123d. Each rounded corner 123c is smoothly curved and connects one outer brim 123a and the corresponding side surface 123f. Each rounded corner 123d is smoothly curved and connects one outer brim 123b and the corresponding side surface 123f. Each corner 123c forms a curved face and has a curvature (inverse of radius of curvature) set at R2. Each corner 123d forms a curved face and has a curvature set at R3. In the same manner, each claw portion 143 has two rounded corners 143c and two rounded corners 143d. Each rounded corner 143c connects one outer brim 143a and the corresponding side surface 143f. Each rounded corner 143d connects one outer brim 143b and the corresponding side surface 143f. Each corner 143c forms a smoothly curved face and has the curvature set at R2. Each corner 143d forms a smoothly curved face and has the curvature set at R3.

The magnet 16 accommodated in each holder unit 15 is formed approximately in a rectangular prism so as to have six flat faces.

Each holder unit 15 is made of stainless steel and has a magnet accommodating holder 151 and a magnet covering holder 152 surrounding the holder 151. The holder 151 is approximately formed in a rectangular parallelepiped (or opened-box) shape having five walls and an opening on respective six faces. The holder 151 accommodates or receives one magnet 16 in an internal space surrounded by the walls such that a portion of the magnet 16 is exposed to or protruded from the opening. The holder 152 is approximately formed in a rectangular parallelepiped (or opened-box) shape having five walls and an opening on respective six faces. The holder 152 accommodates or receives the holder 151 in an internal space surrounded by the walls of the holder 152 such that the surface of the magnet 16 exposed to the opening of the holder 151 is in contact with one wall of the holder 152. Therefore, the magnet 16 exposed to the opening of the holder 151 is covered with the holder 152, and the openings of the holders 151 and 152 are placed at both sides of the holder unit 15 opposite to each other in the radial direction of the rotor 1.

Each holder unit 15 is placed between two adjacent claw portions 123 and 143 such that the opening of the holder 152 faces toward the inner side in the radial direction. Therefore, the opening of the holder 151 faces toward the outer side (i.e., the stator 2).

As shown in FIG. 3, FIG. 4 and FIG. 5, each holder 152 has a bottom wall 152b, two first side walls 152s disposed opposite to each other in the circumferential direction, a second side wall 152f disposed on the front side of the holder 152, and a third side wall 152r disposed on the rear side of the holder 152 to be opposite to the side wall 152f. Each wall is approximately flat. The corner between the bottom wall and each side wall is chamfered to form a rounded corner. For example, a rounded corner 152a is formed between the bottom wall 152b and each first side wall 152s. The curved face of the rounded corner 152a has a curvature set at R1. The curvature R1 of the rounded corners 152a is set to be smaller than the curvature R2 of the rounded corners 123c and 143c of the claw portions 123 and 143.

Because the curvature R1 of the rounded corners 152a is smaller than the curvature R2 of the rounded corners 123c and 143c, the holder 152 is not in contact with the corner 123c or 143c of the claw portion 123 or 143, but flattened surfaces at both ends of the bottom wall 152b of the holder 152 in the circumferential direction are in contact with the inner side surfaces 123i and 143i of the brims 123a and 143a to hold the holder 152 on the claw portions 123 and 143 in the radial direction. Therefore, as compared with a case where corners of the holder 152 are in contact with corners of the claw portions 123 and 143, the contact area of the holder 152 with the claw portions 123 and 143 is widened. Accordingly, the pushing force per unit area received in the holder 152 from the claw portions 123 and 143 can be reduced, and the holder 152 can uniformly press the magnet 16 so as to prevent the magnet 16 from locally receiving an excessive stress. That is, the magnet 16 is unlikely to be cracked or broken.

To tightly hold the holder 152 by two adjacent claw portions 123 and 143 in the circumferential direction, the outer width of the holder 152 in the circumferential direction is set to approximately equal the distance between the side faces 123f and 143f of two claw portions 123 and 143 adjacent to each other. To reliably dispose the holder 151 accommodating the magnet 16 in the holder 152, the outer width of the holder 151 in the circumferential direction is set to be slightly shorter than the inner width of the holder 152 in the circumferential direction.

Each holder 151 has a bottom wall, two first side walls disposed opposite to each other in the circumferential direction, a second side wall disposed on the front side of the holder 151, and a third side wall disposed on the rear side of the holder 151 to be opposite to the second side wall. Both ends of the bottom wall of the holder 151 in the circumferential direction are in contact with the outer side surfaces 123g and 143g of the brims 123b and 143b so as to hold the holder 151 on the claw portions 123 and 143 in the radial direction.

Each of the first side walls of the holder 151 has a convex portion 151a (or first convexity) surrounded by an approximately flattened portion, and the convex portions 151a face each other through the magnet 16. The convex portion 151a is formed in a smoothly-curved convex shape (e.g., wave shape, half-pipe shape or the like) in the center of the first side wall so as to be protuberant toward the inner side of the holder unit 15. Therefore, the projection direction of the convex portions 151a accords with the circumferential direction.

Each of the second and third side walls of the holder 151 has a convex portion 151b (or another first convexity) surrounded by an approximately flattened portion, and the convex portions 151b face each other through the magnet 16. The convex portion 151b is formed in the convex shape in the center of the side wall so as to be protuberant toward the inner side of the holder unit 15. Therefore, the projection direction of the convex portions 151b accords with the axial direction and is perpendicular to the projection direction of the convex portions 151a.

Before the magnet 16 is put into the holder 151, the convex portions 151a of the holder 151 are formed such that the distance between summits of the convex portions 151a is slightly shorter than the length of one side 16a (i.e., shorter side) of the magnet 16 extending along the circumferential direction in the holder 151. Each convex portion 151a is elastically deformable. In the same manner, the convex portions 151b of the holder 151 are formed such that the distance between summits of the convex portions 151b is slightly shorter than the length of one side 16b (i.e., longer side) of the magnet 16 extending along the axial direction in the holder 151. Each convex portion 151b is elastically deformable.

The bottom wall of the holder 151 has a convex portion 151c (or second convexity) surrounded by an approximately flattened portion. The convex portion 151c is formed in the convex shape in the center of the bottom wall so as to be protuberant from the flattened portion by a rising height Hr toward the inner side of the holder unit 15. Therefore, the projection direction of the convex portion 151c accords with the radial direction, and the convex portion 151c is protruded toward the outer side. The convex portion 151c is formed such that the distance between the summit of the convex portion 151c and the opening of the holder 151 is shorter than the length Lt of one side 16c (i.e., thickness) of the magnet 16 directed in the radial direction in the holder 151. Therefore, a portion of the magnet 16 is protruded from the opening of the holder 151. The convex portion 151c is elastically deformable.

When the magnet 16 is put and pressed into the holder 151 through the opening of the holder 151, the convex portions 151a and 151b disposed on the side walls of the holder 151 are pressed against the respective flat faces of the magnet 16 while the other portions of the side walls of the holder 151 are out of contact with the magnet 16. More specifically, the convex portions 151a and 151b are elastically deformed by the inserted the magnet 16 toward the outside of the holder 151 to widen the distance between the convex portions 151a and the distance between the convex portions 151b, and each of the convex portions 151a and 151b comes in elastic contact with the magnet 16. Further, the convex portion 151c comes in elastic contact with one flat face of the magnet 16. During the elastic contact of the convex portions 151a and 151b with the magnet 16, the convex portions 151a and 151b intend to return to the original shape, so that the convex portions 151a and 151b give respective elastic forces to the magnet 16. The convex portions 151a give the elastic forces directed opposite to each other to the magnet 16 along the circumferential direction. The convex portions 151b give the elastic forces directed opposite to each other to the magnet 16 along the axial direction.

Then, the holder 151 is put into the holder 152 through the opening of the holder 152 such that the surface of the magnet 16 protruded from the opening of the holder 151 comes in contact with the bottom wall 152b of the holder 152. Therefore, the holder unit 15 with the magnet 16 is formed.

The distance between the inner side surface 123i of the brim 123a and the outer side surface 123g of the brim 123b along the radial direction is set to equal the distance between the inner side surface 143i of the brim 143a and the outer side surface 143g of the brim 143b along the radial direction. This distance is called a holder receiving length. To tightly press the holder unit 15 placed between the claw portions 123 and 143 in the radial direction, when the holder unit 15 holding the magnet 16 is not placed between two adjacent claw portions 123 and 143, the holder receiving length is set to be shorter than a holder thickness indicated by the difference between the outer surface of the bottom wall of the holder 151 and the outer surface of the bottom wall of the holder 152. The holder thickness equals the sum of the thickness of the bottom wall of the holder 151, the rising height Hr of the convex portions 151c, the thickness Lt of the magnet 16 and the thickness of the bottom wall 152b of the holder 152.

To place the holder unit 15 between two adjacent claw portions 123 and 143 such that the opening of the holder 152 faces toward the inner side of the radial direction, the bottom wall 152b of the holder 152 is pushed toward the bottom wall of the holder 151. Therefore, the convex portion 151c of the holder 151 is elastically deformed toward the outside of the holder unit 15 in the radial direction, and the length of the holder unit 15 in the radial direction is shortened. Then, the holder unit 15 is pressed into a space between the surface 123f of the claw portion 123 and the surface 143f of the claw portion 143, the convex portion 151c of the holder 151 is pressed against the magnet 16 while the other portions of the bottom wall of the holder 151 are out of contact with the magnet 16, and the magnet 16 is in elastic contact with the convex portion 151c. During the elastic contact of the convex portion 151c with the magnet 16, the convex portion 151c gives the elastic force to the magnet 16 toward the outer side in the radial direction, and the bottom wall 152b of the holder 152 gives the reaction force opposite to the elastic force to the magnet 16.

Therefore, because the holder unit 15 is engaged with the brims 123a, 123b, 143a and 143b of the claw portions 123 and 143 so as to be aligned with the holder unit 15 along the radial direction, the holder unit 15 is tightly placed between the brims 123a and 123b and between the brims 143a and 143b. Accordingly, the holder unit 15 can be fixed to the claw portions 123 and 143 in the radial direction, the convex portion 151c of the holder unit 15 can reliably give the elastic force to the magnet 16 in the radial direction, and the magnet 16 can be elastically held in the holder unit 15 in the radial direction.

Further, the convex portion 151a of the holder unit 15 can reliably give the elastic force to the magnet 16 in the circumferential direction, and the convex portion 151b of the holder unit 15 can reliably give the elastic force to the magnet 16 in the axial direction. Accordingly, the magnet 16 can be elastically held in the holder unit 15 in each of the circumferential and axial directions, in addition to the radial direction. That is, even when the magnets 16 held in the holder units 15 differ from one another in size by tolerance in manufacturing, each magnet 16 elastically held in the holder unit 15 can be stably held in the holder unit 15 without being insecurely fixed in the holder unit 15 or rattling in the holder unit 15, and the magnet 16 will resist being broken in the holder unit 15.

Moreover, the holder 152 covers the magnet 16 protruded from the opening of the holder 151. Therefore, even when the alternator 100 or rotor 1 is covered with liquid such as water, the holder 152 can prevent the magnet 16 from being covered with liquid. Accordingly, the magnet 16 can be reliably protected from the liquid, and the corrosion of the magnet 16 caused by corrosive substance can be prevented.

Furthermore, even when the magnet 16 is cracked in the holder unit 15, the holder 152 covering the magnet 16 can reliably prevent broken pieces from flying from the holder unit 15.

A modification of this embodiment will be described. FIG. 6 is a sectional view, taken substantially along line A-A of FIG. 2, of the holder unit 15 according to a modification of the first embodiment.

In this embodiment, the opening of the holder 152 faces toward the inner side of the rotor 1. However, as shown in FIG. 6, the holder unit 15 may be placed between two claw portions 123 and 143 such that the opening of the holder 152 faces toward the outer side in the radial direction.

Further, in this embodiment, the bottom wall of the holder 151 holding the magnet 16 has the convex portion 151c to elastically hold the magnet 16 along the radial direction. However, as shown in FIG. 6, the bottom wall 152b of the holder 152 covering the magnet 16 protruded from the opening of the holder 15 may have a convex portion 152c formed in the convex shape in the center of the bottom wall 152b so as to be protuberant toward the inner side of the holder unit 15. Accordingly, the holder 152 with the convex portion 152c can elastically hold the magnet 16 along the radial direction.

As shown in FIG. 6, the holder unit 15 placed between two claw portions 123 and 143 has the holder 151 with the convex portions 151a and 151b and the holder 152 with the convex portions 152c. The opening of the holder 151 faces toward the inner side of the rotor 1, and the opening of the holder 152 faces toward the outer side of the rotor 1. The convex portions 152c are in elastic contact with the magnet 16 protruded from the opening of the holder 151 so as to elastically push the magnet 16 toward the outer side.

The curvature R1 of the rounded corners 152a of the holder 152 is set to be smaller than the curvature R3 of the corners 123d and 143d of the claw portions 123 and 143. Therefore, the holder 152 is not in contact with the corner 123d or 143d of the claw portion 123 or 143, but flattened surfaces at both ends of the bottom wall 152b of the holder 152 in the circumferential direction are in face contact with the inner side faces 123g and 143g of the brims 123b and 143b to hold the holder 152 on the claw portions 123 and 143 in the radial direction. Therefore, as compared with a case where corners of the holder 152 are in contact with corners of the claw portions 123 and 143, the contact area of the holder 152 with the claw portions 123 and 143 is widened.

Accordingly, the pushing force per unit area received in the holder 152 from the claw portions 123 and 143 can be reduced, and the holder 152 can uniformly press the magnet 16 so as to prevent the magnet 16 from locally receiving an excessive stress. That is, the magnet 16 is unlikely to be cracked or broken.

In this modification, the bottom wall of the holder 151 has no convex portion, and the whole bottom wall of the holder 151 is substantially in face contact with the magnet 16. However, the bottom wall of the holder 151 may have the convex portion 151c. In this case, the magnet 16 is elastically held by each of the holders 151 and 512 along the radial direction.

In this embodiment and modification, the holder 151 has two convex portions 151a on the respective first side walls. However, the holder 151 may have only one convex portion 151a to elastically hold the magnet 16 in the circumferential direction. In this case, the whole side wall of the holder 151 opposite to the side wall having the convex portion 151a is substantially in face contact with the magnet 16. Further, the holder 151 may have only one convex portion 151b to elastically hold the magnet 16 in the axial direction. In this case, the whole side wall of the holder 151 opposite to the side wall having the convex portion 151b is substantially in face contact with the magnet 16. Accordingly, even when the holder 151 has only one convex portion 151a or 152b, the holder 151 can give the elastic force to the magnet 16.

Further, in this embodiment and modification, the holder unit 15 has both the convex portions 151a and 151b. However, the holder unit 15 may have only one convex portion 151a or 151b and one convex portion 151c or 152c. Even in this case, because the elastic forces from two convex portions are given to the magnet 16 in respective directions differing from each other, the magnet 16 can be reliably held in the holder unit 15 while being reliably protected from water or the like.

Figure 7A:
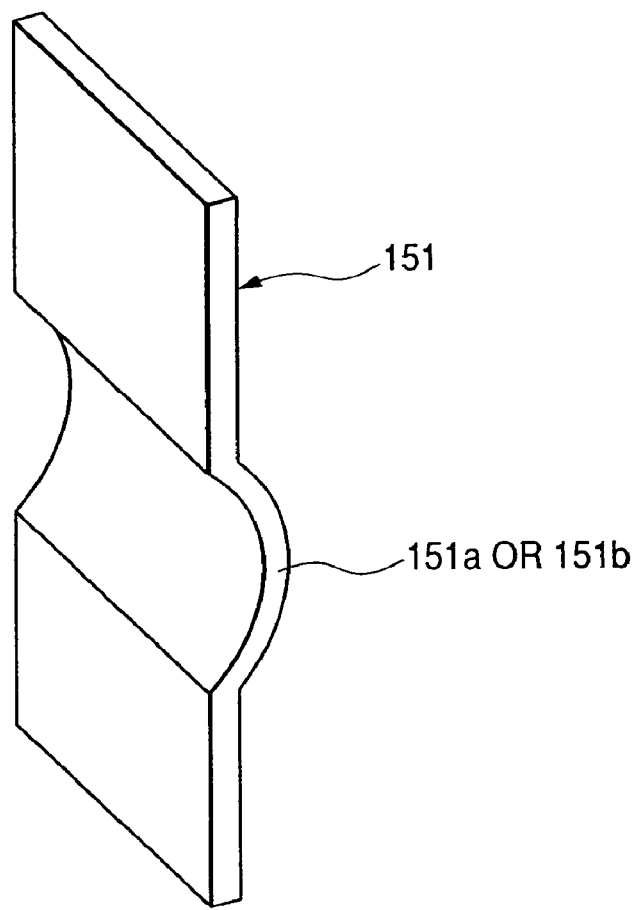
FIG. 7A is a perspective side view of one wall of one holder in the holder unit shown in FIG. 3 or FIG. 6 according to the first embodiment.
Figure 7B:
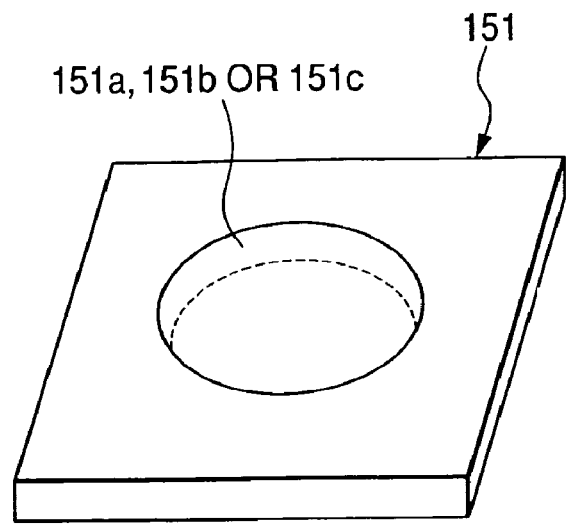
FIG. 7B is a perspective side view of one wall of one holder in the holder unit shown in FIG. 3 or FIG. 6 according to a modification of the first embodiment.

Moreover, in this embodiment and modification, as shown in FIG. 5 and FIG. 7A, each convex portion is formed in the convex shape such as a wave shape, a half-pipe shape or the like. However, as shown in FIG. 7B, each convex portion may be formed in a convex shape such as a hemispherical shape or the like so as to be in contact with a circular area of the corresponding surface of the magnet 16.

Furthermore, each convex portion is placed in the center of the corresponding wall. However, each convex portion may be placed out of the center of the corresponding wall.

Embodiment 2

Figure 8:
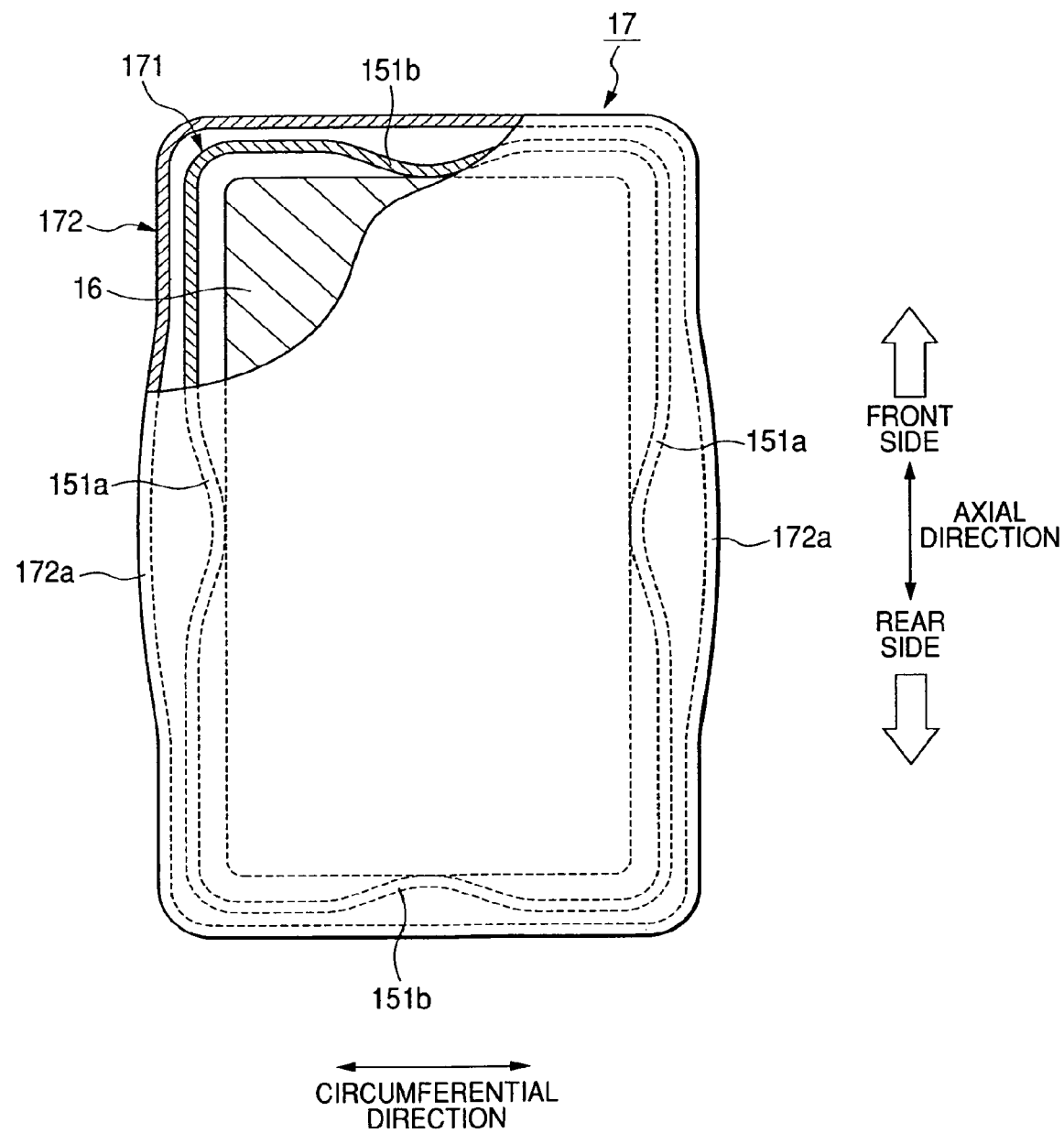
FIG. 8 is a plan view, partially in cross-section, of a holder unit accommodating a magnet according to the second embodiment of the present invention.

FIG. 8 is a plan view, partially in cross-section, of a holder unit accommodating the magnet 16 according to the second embodiment.

As shown in FIG. 8, a holder unit 17 made of stainless steel holds the magnet 16. The holder unit 17 has a magnet accommodating holder 171 accommodating or receiving one magnet 16 and a magnet covering holder 172 accommodating or receiving the holder 171. The holder 171 has the convex portions 151*a* to 151*c* so as to be configured in the same structure as that of the holder 151 (see FIG. 4). The holder 172 differs from the holder 152 (see FIG. 4) in that the holder 172 has two convex portions 172*a* (i.e., third convexity) existing in respective side walls placed opposite to each other in the circumferential direction. The holder unit 17 is disposed between two adjacent claw portions 123 and 143 in each pair such that the holder 172 has an opening facing toward the inner side of the rotor 1, in the same manner as the holder 152 shown in FIG. 3.

Each convex portion 172*a* is formed in the convex shape in the center of the side wall so as to be protuberant toward the outer side of the holder unit 17. Therefore, the projection direction of the convex portions 172*a* accords with the circumferential direction. The distance between summits of the convex portions 172*a* in the holder unit 17 not yet placed between the claw portions 123 and 143 is set to be slightly longer than the distance between the side surfaces 123*f* and 143*f* of the claw portions 123 and 143 (see FIG. 3). When the holder unit 17 is pressed into the space between the claw portions 123 and 143, the convex portions 172*a* of the holder 172 are elastically deformed by the claw portions 123 and 143 toward the inside of the holder unit 17 to shorten the distance between the convex portions 172*a* to the distance between the side surfaces 123*f* and 143*f*, and each convex portion 172*a* comes in elastic contact with the claw portions 123 and 143. Therefore, the convex portions 172*a* give respective elastic forces directed opposite to each other to the claw portions 123 and 143 along the circumferential direction, so that the holding unit 17 can be elastically fitted to the claw portions 123 and 143 in the circumferential direction.

Accordingly, in addition to the effects in the first embodiment, the holding unit 17 can be elastically fitted to the claw portions 123 and 143 in the circumferential direction without being insecurely fixed to the claw portions 123 and 143.

In this embodiment, the holder 172 has an opening facing toward the inner side of the rotor 1, in the same manner as the holder 152 shown in FIG. 3. However, the holder 172 may have an opening facing toward the outer side of the rotor 1, in the same manner as the holder 152 shown in FIG. 4.

Embodiment 3

One of the holders in each holding unit may have a plurality of convex portions being in elastic contact with the other holder to further reliably fix the holders to each other.

Figure 9:
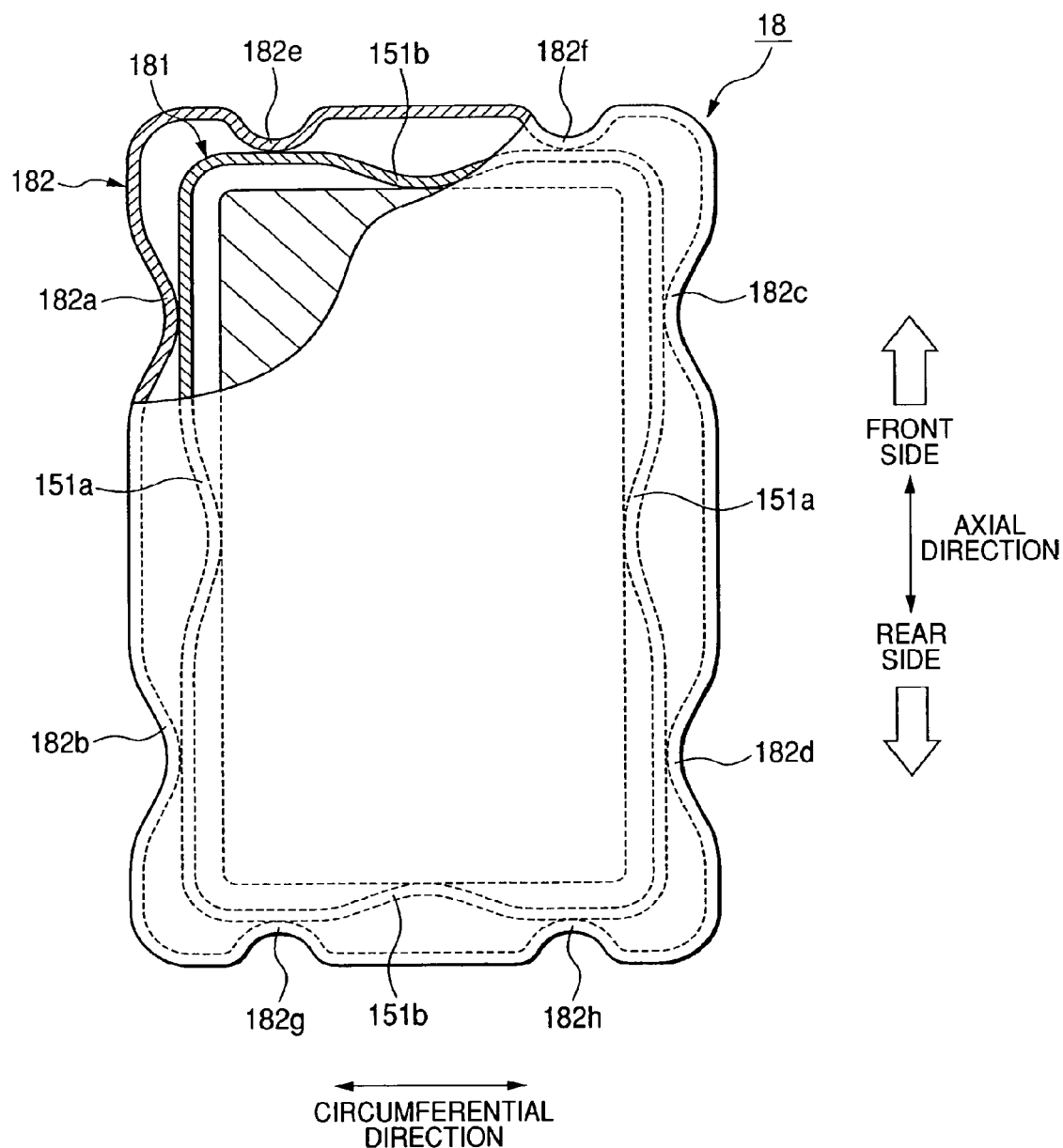
FIG. 9 is a plan view, partially in cross-section, of a holder unit accommodating a magnet according to the third embodiment of the present invention.

FIG. 9 is a plan view, partially in cross-section, of a holder unit accommodating the magnet 16 according to the third embodiment.

As shown in FIG. 9, a holder unit 18 made of stainless steel holds the magnet 16. The holder unit 18 has a magnet accommodating holder 181 accommodating or receiving one magnet 16 and a magnet covering holder 182 accommodating or receiving the holder 181. The holder 181 has the convex portions 151*a* to 151*c* so as to be configured in the same structure as that of the holder 151 (see FIG. 4). The holder 182 differs from the holder 152 (see FIG. 4) in that the side walls of the holder 182 have a plurality of convex portions 182*a* to 182*f* (or fourth convexity). These convex portions of each side wall of the holder 182 are in elastic contact with the side wall of the holder 181 facing the side wall of the holder 182.

The holder unit 18 is disposed between two adjacent claw portions 123 and 143 in each pair such that the holder 182 has an opening facing toward the inner side of the rotor 1, in the same manner as the holder 152 shown in FIG. 3.

The holder 182 has a bottom wall, two first side walls disposed opposite to each other in the circumferential direction, a second side wall disposed on the front side of the holder 182, and a third side wall disposed on the rear side of the holder 182 to be opposite to the second side wall in the axial direction. Each of the convex portions 182*a* to 182*f* is formed in the convex shape in one side wall of the holder 182 so as to be protuberant toward the inner side of the holder unit 18 and to be in contact with the flat portion of the holder 181.

One first side wall of the holder 182 has the convex portions 182*a* and 182*b* which are aligned along the axial direction and are symmetric with respect to the center of the side wall. The other first side wall of the holder 182 has convex portions 182*c* and 182*d* which are aligned along the axial direction and are symmetric with respect to the center of the side wall. The convex portions 182*a* and 182*c* are placed to be shifted from the convex portions 151*a* of the holder 181 toward the front side and to be opposite to each other in the circumferential direction. The convex portions 182*b* and 182*d* are placed to be shifted from the convex portions 151*a* of the holder 181 toward the rear side and to be opposite to each other in the circumferential direction. The projection direction of the convex portions 182*a* to 182*d* agrees with the circumferential direction.

The second side wall of the holder 182 has the convex portions 182*e* and 182*f* which are aligned along the circumferential direction and are symmetric with respect to the center of the side wall. The third side wall of the holder 182 has the convex portions 182*g* and 182*h* which are aligned along the circumferential direction and are symmetric with respect to the center of the side wall. The convex portions 182*e* and 182*g* are placed to be shifted from the convex portions 151*b* of the holder 181 toward one side in the circumferential direction and to be opposite to each other in the axial direction. The convex portions 182*f* and 182*h* are placed to be shifted from the convex portions 151*b* of the holder 181 toward the other side in the circumferential direction and to be opposite to each other in the axial direction. The projection direction of the convex portions 182*e* to 182*h* accords with the axial direction.

The distance between the summits of the convex portions facing each other in the holder 182 not yet fitted to the holder 181 is set to be slightly shorter than the distance between the outer surfaces of the corresponding side walls facing each other in the holder 181. The holder 181 accommodating the magnet 16 is forcibly put into the holder 182 such that each of the convex portions 182*a* to 182*h* is in elastic contact with the flat portion of the holder 181. Therefore, the convex portions 182*a* to 182*h* of the holder 182 give respective elastic forces to the holder 181 such that the holders 181 and 182 are tightly fitted to each other. Further, the magnet 16 protruded from the opening of the holder 181 is covered with the holder 182.

Because the convex portions 182a to 182h are out of contact with the convex portions 151a of the holder 181, the elastic force given to the holder 181 by each of the convex portions 182a to 182h is directed to the circumferential or axial direction. More specifically, the convex portions 182a and 182c give the elastic forces directed opposite to each other to the holder 181 in the circumferential direction, and the convex portions 182b and 182d give the elastic forces directed opposite to each other to the holder 181 in the circumferential direction. The convex portions 182e and 182g give the elastic forces directed opposite to each other to the holder 181 in the axial direction, and the convex portions 182f and 182h give the elastic forces directed opposite to each other to the holder 181 in the axial direction. Because of the symmetry of the convex portions 182a and 182b with respect to the center of one first side wall of the holder 182 and the symmetry of the convex portions 182c and 182d with respect to the center of the other first side wall of the holder 182, the holder 181 can uniformly receive the elastic forces from the convex portions 182a to 182d of the holder 182. In the same manner, because of the symmetry of the convex portions 182e and 182f with respect to the center of one second side wall of the holder 182 and the symmetry of the convex portions 182g and 182h with respect to the center of the third side wall of the holder 182, the holder 181 can uniformly receive the elastic forces from the convex portions 182e to 182h of the holder 182.

Accordingly, in addition to the effects in the first embodiment, the holder 181 accommodating the magnet 16 can be stably and tightly fitted to the holder 182 without being insecurely fixed in the holder unit 18.

In this embodiment, the holder 182 may have the convex portions 172a shown in FIG. 8. In this case, the holding unit 18 can be elastically fitted to the claw portions 123 and 143, in the same manner as in the second embodiment.

Further, in this embodiment, the holder 182 has an opening facing toward the inner side of the rotor 1, in the same manner as the holder 152 shown in FIG. 3. However, the holder 182 may have an opening facing toward the outer side of the rotor 1, in the same manner as the holder 152 shown in FIG. 4.

Figure 10:
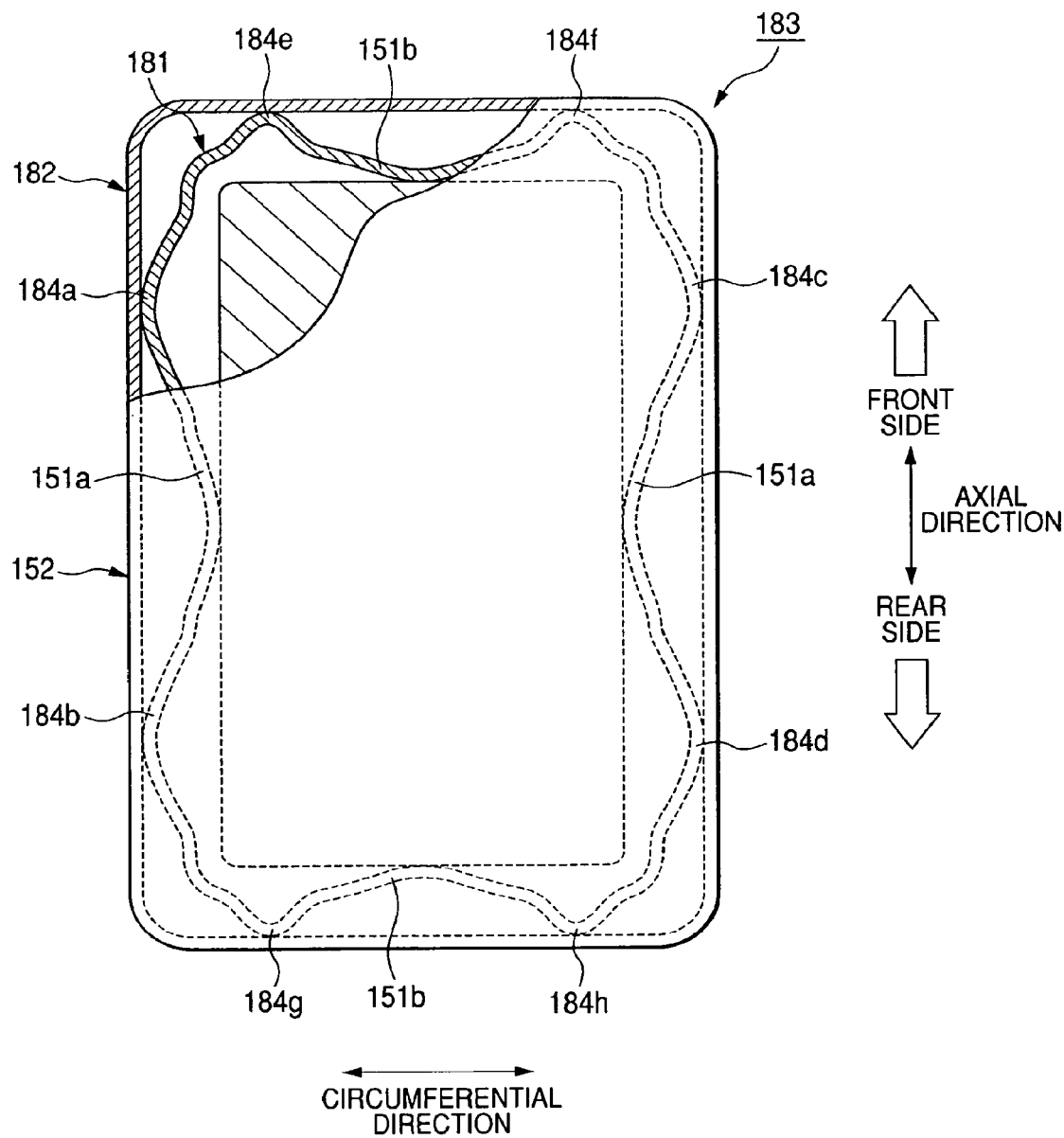
FIG. 10 is a plan view, partially in cross-section, of a holder unit accommodating a magnet according to a modification of the third embodiment.

Moreover, in this embodiment, the convex portions 182a to 182f are formed in the magnet covering holder to be in elastic contact with the magnet accommodating holder. However, a plurality of convex portions may be formed in the magnet accommodating holder to be in elastic contact with the magnet covering holder according to a modification of the third embodiment. FIG. 10 is a plan view, partially in cross-section, of a holder unit accommodating the magnet 16 according to this modification of the third embodiment.

As shown in FIG. 10, a holder unit 183 disposed between the claw portions 123 and 143 in each pair has the magnet covering holder 152 and a magnet accommodating holder 184. The holder 184 differs from the holder 151 in that the holder 184 additionally has a plurality of convex portions 184a to 184h (or fourth convexity) existing in four side walls thereof.

The convex portions 184a and 184b disposed on one first side wall in symmetric with one convex portion 151a are in elastic contact with one side wall of the holder 152 facing the first side wall. The convex portions 184c and 184d disposed on another first side wall in symmetric with the other convex portion 151a are in elastic contact with one side wall of the holder 152 facing the other first side wall. The convex portions 184e and 184f disposed on one second side wall in symmetric with one convex portion 151b are in elastic contact with one side wall of the holder 152 facing the second side wall. The convex portions 184g and 184h disposed on the other second side wall in symmetric with the other convex portion 151b are in elastic contact with one side wall of the holder 152 facing the other second side wall.

Accordingly, the same effects as in the third embodiment can be obtained.

Embodiment 4

In the first to third embodiments, the magnet accommodating holder of each holder unit has the convex portions being elastically in contact with the magnet 16. However, the present invention is not limited to the convex portions. The magnet accommodating holder of each holder unit may be elastically in contact with the magnet 16 through an elastic member.

Figure 11:
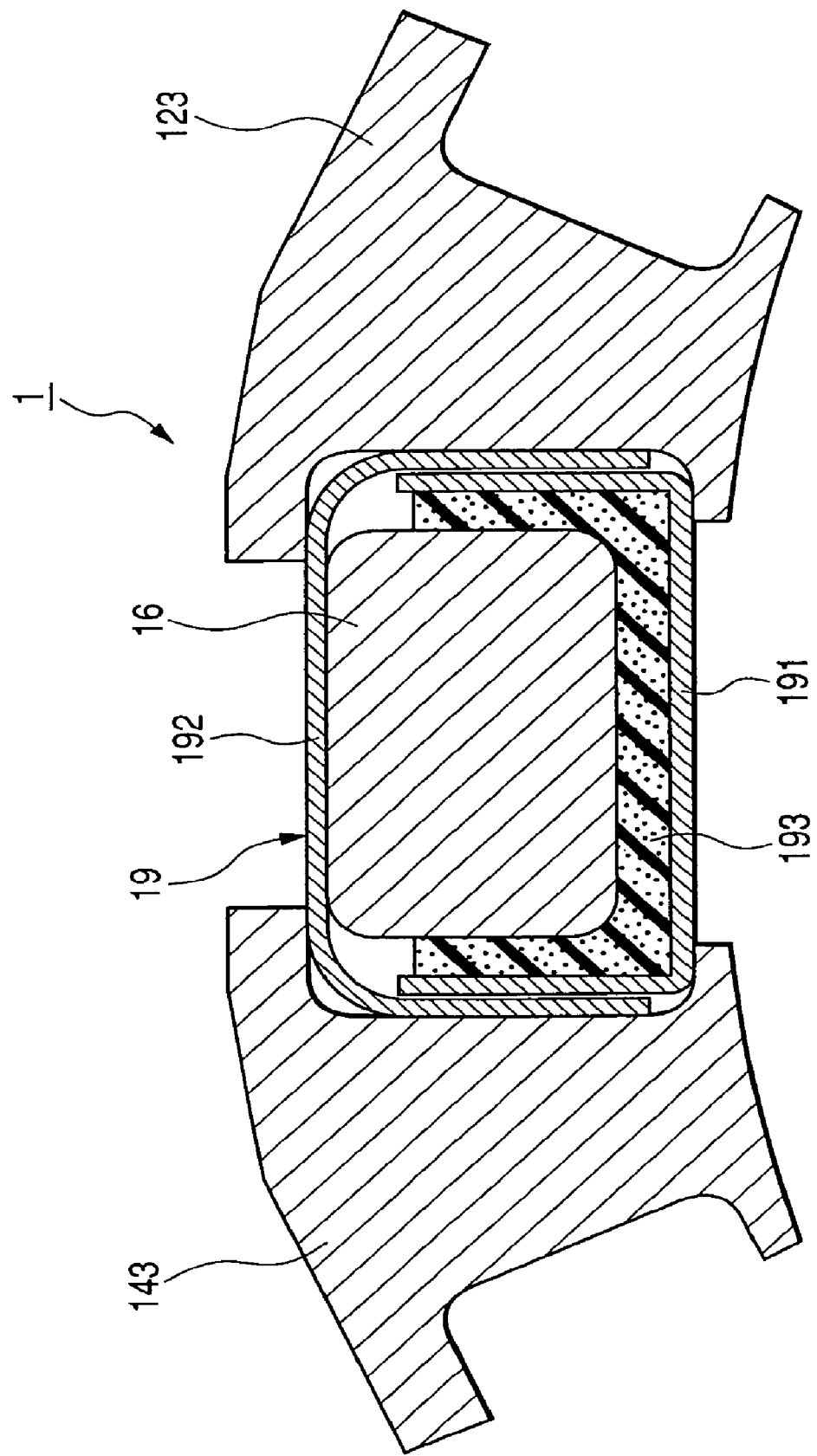
FIG. 11 is a sectional view, taken substantially along line A-A of FIG. 2, of a holder unit accommodating a magnet according to the fourth embodiment of the present invention.

FIG. 11 is a sectional view, taken substantially along line A-A of FIG. 2, of a holder unit accommodating a magnet according to the fourth embodiment.

As shown in FIG. 11, a holder unit 19 is disposed between two adjacent claw portions 123 and 143 in each pair. The holder unit 19 has a magnet accommodating holder 191 accommodating or receiving one magnet 16, a magnet covering holder 192 accommodating or receiving the holder 191, and an elastic member 193. The holder 191 is approximately formed in a rectangular parallelepiped (or opened-box) shape having five walls and an opening on respective six faces. Each wall of the holder 191 is approximately flattened. The holder 192 is approximately formed in a rectangular parallelepiped (or opened-box) shape having five flattened walls and an opening on respective six faces so as to be configured in the same structure as that of the holder 152 shown in FIG. 3. The elastic member 193 is made of an elastic material such as resin, rubber or the like. Therefore, the member 193 is elastically deformable.

The member 193 is uniformly disposed in an inner space of the holder 191 to be uniformly in contact with the whole internal surface of the holder 191. The magnet 16 is disposed in the holder 191 through the member 193 such that the whole space between the magnet 16 and the holder 191 is substantially filled with the member 193. Therefore, the member 193 is placed between the holder 191 and the magnet 16 to be in contact with the holder 191 and the magnet 16. A portion of the magnet 16 is protruded from the opening of the holder 191. The holder 191 accommodating the magnet 16 through the member 193 is placed in the holder 192 such that the holder 192 covers the magnet 16.

When the holder unit 19 is not place between the claw portions 123 and 143, the thickness of the holder unit 19 between the outer surface of the bottom wall of the holder 191 and the outer surface of the bottom wall of the holder 192 is slightly larger than the holder receiving length between the surfaces 123i and 123g of the claw portion 123 (or between the surfaces 143i and 143g of the claw portion 143). To place the holder unit 19 between the claw portions 123 and 143, the bottom wall of the holder 192 is pushed toward the holder 191 to deform the member 193 and to shorten the thickness of the holder unit 19 to the holder receiving length. Therefore, the magnet 16 is pressed into the holder 191 while uniformly receiving the repulsion force from the member 193. That is, the magnet 16 is uniformly in elastic contact with the member 193.

Accordingly, even when the magnets 16 held in the holder units 15 differ from one another in size by tolerance in manufacturing, the member 193 uniformly disposed in a space between the magnet 16 and the holder 191 can prevent the magnet 16 from being insecurely fixed in the holder unit 19, and the magnet 16 can be stably disposed in the holder unit 19.

In this embodiment, the holder unit 19 is place between the claw portions 123 and 143 such that the holder 192 has the opening facing toward the inner side of the rotor 1, in the same manner as the holder 152 shown in FIG. 3. However, the holder 192 may have the opening facing toward the outer side of the rotor 1, in the same manner as the holder 152 shown in FIG. 4.

Further, in this embodiment, the holder 191 may have the convex portions 151a, 151b, 151c and/or 172a. The holder 191 may have the holder 182 in place of the holder 192. The holder 191 may have the holder 184 in place of the holder 191.

A modification of the first to fourth embodiments will be described with reference to FIG. 12.

Figure 12:
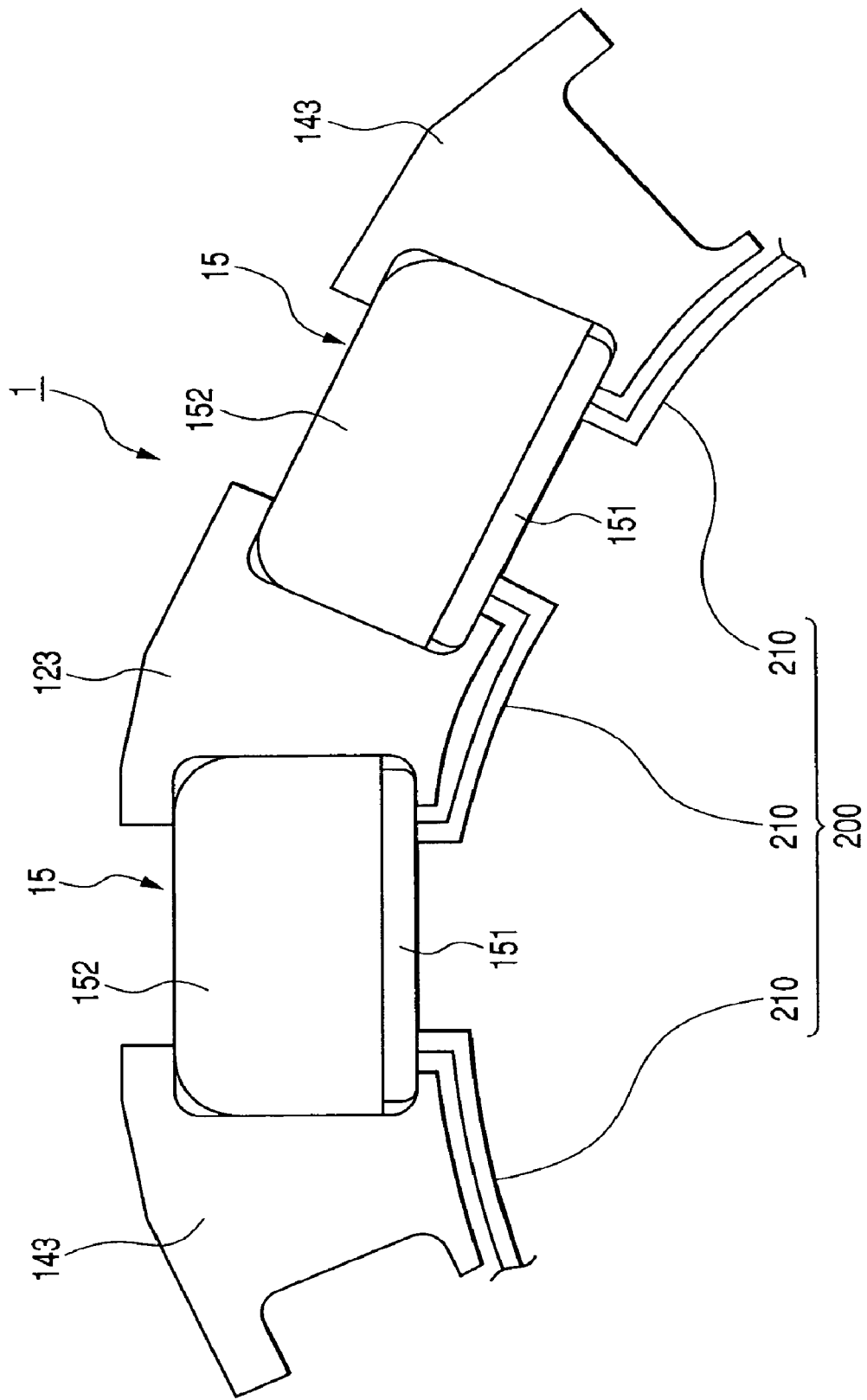
FIG. 12 is a schematic side view of holder units according to a modification of the first embodiment.

FIG. 12 is a schematic side view of the holder units 15 according to a modification of the first embodiment.

As shown in FIG. 12, the rotor 1 may have a connecting unit 200 for serially connecting the magnet accommodating holders or the magnet covering holders of the holding units 15 or some of the holding units 15. The connecting unit 200 has a plurality of holder connecting member 210 each of which connects two holder units adjacent to each other through one claw portion 123 or 143. The members 210 are disposed between the group of claw portions and the field coil 13 (see FIG. 1).

When the holder 152 has the opening facing toward the inner side of the rotor 1, both ends of each member 210 are connected with the holder 151. In contrast, when the holder 152 has the opening facing toward the outer side of the rotor 1, both ends of each member 210 are connected with the holder 152.

Accordingly, the holder units of the rotor 1 can be treated as one member of the rotor 1, so that the holder units can be easily attached to the pole cores 12 and 14.

In this modification, all holder units 15 of the rotor 1 are serially connected with one another. However, the holder units of the rotor 1 may be partitioned into a plurality of blocks to serially connect the holder units 15 through the members 210 for each block. No connecting member is disposed between different blocks. For example, each block has two, three or four holder units.

Further, the connecting unit 200 may serially connects the magnet accommodating holders or the magnet covering holders of the holding units 17, 18, 183 or 19 or some of the holding units 17, 18, 183 or 19.

These embodiments should not be construed as limiting the present invention to structures of those embodiments, and the structure of this invention may be combined with that based on the prior art.

What is claimed is:

1. An alternator, comprising:
a stator; and
a rotor, disposed in a center hole of the stator, which is rotated on its own axis to generate electric power in the stator,
the rotor comprising:
a pole core having a plurality of claw portions disposed along a circumferential direction of the rotor;
a field coil disposed on an inner side of the claw portions in a radial direction of the rotor;
a plurality of holder units each of which is disposed between two claw portions adjacent to each other such that the holder units and the claw portions are alternately arranged along the circumferential direction; and
a plurality of magnets, respectively, disposed in the holder units,
each holder unit comprising:
a magnet accommodating holder, formed substantially in a box shape so as to have a bottom wall, four side walls extending from the bottom wall and an opening on respective six faces, which accommodates the corresponding magnet; and
a magnet covering holder, formed substantially in a box shape so as to have a bottom wall, four side walls extending from the bottom wall and an opening on respective six faces, which accommodates the magnet accommodating holder so as to cover the magnet exposed to the opening of the magnet accommodating holder and is disposed between the corresponding claw portions such that the opening of the magnet covering holder faces toward a side in the radial direction,
each of the side walls of the magnet accommodating holder having a first convexity which is in elastic contact with the magnet,
the bottom wall of at least one of the magnet accommodating holder and the magnet covering holder having a second convexity which is in elastic contact with the magnet.

2. The alternator according to claim 1, wherein the first convexity has a plurality of convex portions existing in the side walls of the magnet accommodating holder or some of the side walls of the magnet accommodating holder so as to give respective elastic forces to the magnet such that the elastic forces are given to the magnet in respective directions differing from each other.

3. The alternator according to claim 1, wherein the first convexity is in elastic contact with one flat face of the magnet.

4. The alternator according to claim 1, wherein each of the claw portions has an outer brim protruding along the circumferential direction from an outer end of the claw portion in the radial direction, and the holder unit is engaged with the outer brim of each corresponding claw portion aligned with the holder unit along the radial direction.

5. The alternator according to claim 4, wherein the magnet covering holder is disposed between the corresponding claw portions such that the opening of the magnet covering holder faces toward an inner side of the rotor in the radial direction, the magnet covering holder has a rounded corner connecting the bottom wall and each of the side walls placed opposite to each other in the circumferential direction, each of the claw portions has a rounded corner connecting the outer brim and one of two side surfaces placed opposite to each other in the circumferential direction, and a curvature of each rounded corner of the magnet covering holder is smaller than a curvature of the rounded corner of the corresponding claw portion.

6. The alternator according to claim 4, wherein each of the claw portions has an inner brim protruding along the circumferential direction from an inner end of the claw portion in the radial direction, and the holder unit is engaged with the inner and outer brims of each claw portion aligned with the holder unit along the radial direction.

7. The alternator according to claim 6, wherein a distance between the inner and outer brims in each of the claw portions corresponding to each holder unit is shorter than a distance between an outer face of the bottom wall of the magnet accommodating holder and an outer face of the bottom wall of the magnet covering holder, on condition that the holder unit is not engaged with the claw portions.

8. The alternator according to claim 6, wherein the magnet covering holder is disposed between the corresponding claw portions such that the opening of the magnet covering holder faces toward an outer side of the rotor in the radial direction, the magnet covering holder has a rounded corner connecting the bottom wall and each of the side walls placed opposite to each other in the circumferential direction, each of the claw portions has a rounded corner connecting the inner brim and one of two side surfaces placed opposite to each other in the circumferential direction, and a curvature of each rounded corner of the magnet covering holder is smaller than a curvature of the rounded corner of the corresponding claw portion.

9. The alternator according to claim 1, wherein one of the side walls facing the claw portions in each magnet covering holder has a third convexity being in elastic contact with the corresponding claw portion.

10. The alternator according to claim 1, wherein one of the holders has a fourth convexity being in elastic contact with the other holder.

11. The alternator according to claim 1, wherein the rotor has a connecting unit connecting the magnet accommodating holders or the magnet receiving holders of the holder units with one another.

12. The alternator according to claim 1, wherein the pole core comprises:
   a first pole core having a first core body and a plurality of first claw portions each of which extends from the first core body toward one side in an axial direction of the rotor; and
   a second pole core having a second core body and a plurality of second claw portions each of which extends from the second core body toward the other side in the axial direction, the first claw portions and the second claw portions being alternately arranged along the circumferential direction as the claw portions.

13. An alternator, comprising:
   a stator; and
   a rotor, disposed in a center hole of the stator, which is rotated on its own axis to generate electric power in the stator,
   the rotor comprising:
      a pole core having a plurality of claw portions disposed along a circumferential direction of the rotor;
      a field coil disposed on an inner side of the claw portions in a radial direction of the rotor;
      a plurality of holder units each of which is disposed between two claw portions adjacent to each other such that the holder units and the claw portions are alternately arranged along the circumferential direction; and
      a plurality of magnets, respectively, disposed in the holder units,
   each holder unit comprising:
      a magnet accommodating holder, formed substantially in a box shape and having an opening, which accommodates the corresponding magnet;
      a magnet covering holder, formed substantially in a box shape and having an opening, which accommodates the magnet accommodating holder so as to cover the magnet exposed to the opening of the magnet accommodating holder and is disposed between the corresponding claw portions such that the opening of the magnet covering holder faces toward a side in the radial direction; and
      an elastic member disposed substantially uniformly in a space between the magnet and the magnet accommodating holder so as to be in elastic contact with the magnet and the magnet accommodating holder.

14. The alternator according to claim 13, wherein the space between the magnet and the magnet accommodating holder is filled with the elastic member.

* * * * *